United States Patent

Nagy

[11] Patent Number: 5,893,193
[45] Date of Patent: Apr. 13, 1999

[54] MOTOR-VEHICLE WINDSCREEN WIPER BLADE

[75] Inventor: Tibor Nagy, Leuven, Belgium

[73] Assignee: Robert Bosch GmbH, Stuttgart, Germany

[21] Appl. No.: 08/930,154

[22] PCT Filed: Feb. 4, 1997

[86] PCT No.: PCT/DE97/00202

§ 371 Date: Oct. 6, 1997

§ 102(e) Date: Oct. 6, 1997

[87] PCT Pub. No.: WO97/33780

PCT Pub. Date: Sep. 18, 1997

[30] Foreign Application Priority Data

Mar. 12, 1996 [DE] Germany ............... 196 09 578

[51] Int. Cl.$^6$ ............................................. B60S 1/38
[52] U.S. Cl. ............................................. 15/250.48
[58] Field of Search ............... 15/250.48, 250.4, 15/250.41, 230.361, 245; 428/492

[56] References Cited

U.S. PATENT DOCUMENTS 4,716,618  1/1988  Yasukawa et al. ............... 15/250.48

FOREIGN PATENT DOCUMENTS

| 3440677A1 | 5/1985 | Germany. | |
|---|---|---|---|
| 3904152 | 8/1990 | Germany | 15/250.48 |
| 61-105257 | 5/1986 | Japan | 15/250.48 |
| 62-279155 | 12/1987 | Japan | 15/250.48 |
| 63-93650 | 4/1988 | Japan | 15/250.48 |

Primary Examiner—Gary K. Graham
Attorney, Agent, or Firm—Michael J. Striker

[57] ABSTRACT

A wiper blade for windshields of motor vehicles, has an elongated wiper strip having a constant diameter, which is held by a support frame and loaded toward the windshield to be wiped is movable over the windshield transversely to its longitudinal extension, wherein, viewed in cross section, the wiper strip has a tip held by a support frame and consisting of synthetic caoutchouc and a skirting strip connected with it, on whose side facing away from the tip a movable wiper lip strip resting on the windshield is attached by means of an elongated tilting bar. A wiper blade, which is dependable in operation over time and can be produced in a cost-effective manner results in that at least a portion of the areas forming the outer contour of the skirting strip consists of natural caoutchouc with a low coefficient of friction.

6 Claims, 1 Drawing Sheet

MOTOR-VEHICLE WINDSCREEN WIPER BLADE

BACKGROUND OF THE INVENTION

The invention relates to a wiper blade for cleaning windshields of motor vehicles.

The wiper strips which are a part of the wiper blade which serves to remove water drops from the windshield of a motor vehicle, for example, and which are attached to the wiper blades of a wiper blade device that move back and forth in front of the windshield, are customarily produced, in that a previously compounded and vulcanized initial rubber material, therefore an un-vulcanized synthetic caoutchouc, is shaped in a metal mold and vulcanized. Subsequently the surface of the thus obtained rubber wiper strip is post-treated in order to reduce the friction resistance on the windshield to be wiped in accordance with the requirements, or to improve the slidability of the rubberized wiper strip on the windshield to be wiped. At a temperature t of 23°±5° C. and a relative humidity of 50±3%, the desired coefficient of friction A may not exceed the value of 2.0. This post-treatment of the surface consists for example of a hardening of the surface of the rubberized wiper strip by chlorination or of a coating, in order to achieve a surface layer of the wiper strip which contains a fine, lubricating powder, for example powder-like molybdenum sulfide. Even though the chlorination reduces the friction resistance and improves the slidability, the necessary durability for wear and tear is still missing. The application of a lubricating surface layer containing powder presents the disadvantage in that it is scraped off after the wiper strip has been in use for a short period of time, thus lacking the necessary durability.

Incidentally, it should be considered that the improvement of the sliding properties of the wiper strips because of the reduced friction coefficient between the wiper strip and the glass surface of the windshield presents difficulties in that they do not tilt in the tilting bar when the wiper blade reverses directions during the operation of the wiper blade device which is normally embodied as pendular wiping device, so that the wiper strip is not dragged but pushed. A flawless, noiseless operation of the wiper blade device is thus ruled out.

To overcome this problem, in connection with a known wiper blade (DE 34 40 677 A1) of the species in question, the areas of the wiper strip which come into contact with the windshield during the wiper blade operation were made of a lubricating synthetic rubber, for example urethane rubber, styrene butadiene rubber, fluoro rubber, chlorinated sulfonized rubber or a mixture of these materials. However, such wiper strips are not, or are only insufficiently halogenizable, so that the desired coefficient of friction can hardly be reached.

SUMMARY OF THE INVENTION

It is the object of the invention to develop a rubber wiper blade, which is distinguished by superior sliding properties, in particular by a very low friction resistance remaining constant over the long-term and which can be produced in a cost effective way. It is also intended to provide areas of the wiper strip with an advantageous; coefficient of friction, which occasionally come into contact with the surface of the windshield to be cleaned.

In the inventive rubber wiper blade the desired coefficient of friction between both sliding components of wiper lip strip and vehicle windshield is practically maintained indefinitely. However, a certain friction is necessary in order to achieve the tilting motion of the wiper lip strip. This tilting motion occurs in the reversed pendular movements of the wiper strip and assures the required drag position of the wiper lip strip which is necessary in both pendular directions for proper achievement of the wiping operation.

A further improvement in attaining the object results if at least a portion of the areas forming the outer contour of the wiper lip strip consists of a natural caoutchouc with a low coefficient of friction, because in this way the coefficient of friction of the wiper lip strip which has to perform the main portion of the cleaning is matched to the coefficient of friction of the skirting strip.

The wiper strip areas equipped in this way are hardenable, wherein their shape can be kept constant, even under difficult wiping conditions. In this way an improved and secure holding of the wiper strip in the claws of the support frame is assured and the required mobility of the wiper strip in the claws is guaranteed.

A particularly cost effective production of the wiper strip results, if the wiper strip has a base component made of synthetic caoutchouc enveloping the tip, of which a core area of the skirting strip and the tilting bar are a part, if in addition two wings are arranged, made of natural caoutchouc with a low coefficient of friction, extending away from the core area consecutively in different directions and which are a part of the skirting strip, and finally, if the tilting bar makes a transition into a connector strip, on which the wiper lip strip consisting of natural caoutchouc with a low coefficient of friction is arranged.

The natural caoutchouc areas of the wiper strip are hardened by halogenization, while the other wiper strip areas remain soft and pliable. Depending on the degree of halogenization, the hardenable areas can be adjusted in accordance with the requirements. This also applies to the desired coefficient of friction.

Additional advantages of the invention are to be taken from the following description, which relates to an exemplary embodiment of the invention represented in the drawings.

BRIEF DESCRIPTION OF THE DRAWINGS

The invention will be explained in what follows by means of an exemplary embodiment represented in the drawings. Shown are in FIG. 1 a partial view of a wiper blade, which consists of a support frame and a wiper strip, in FIG. 2 an enlarged view of a section through the wiper strip along the line II—II, and in FIG. 3 the wiper strip in accordance with FIG. 2, shown not to scale, in an extreme operating position which can be attained only under certain conditions.

DESCRIPTION OF THE PREFERRED EMBODIMENT

Figure 1:
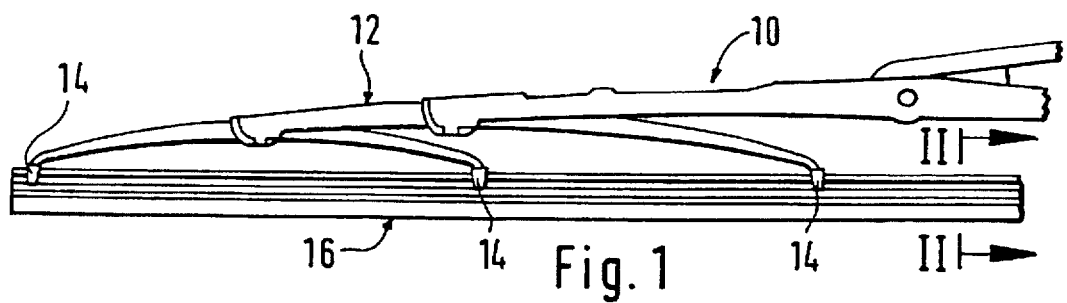

A wiper blade 10, represented partially and in a plan view, in FIG. 1 has a support frame 12 consisting of several support bracket parts, holding an elongated wiper strip 16 made of an elastic material by means of holding claws 14.

Figure 2:
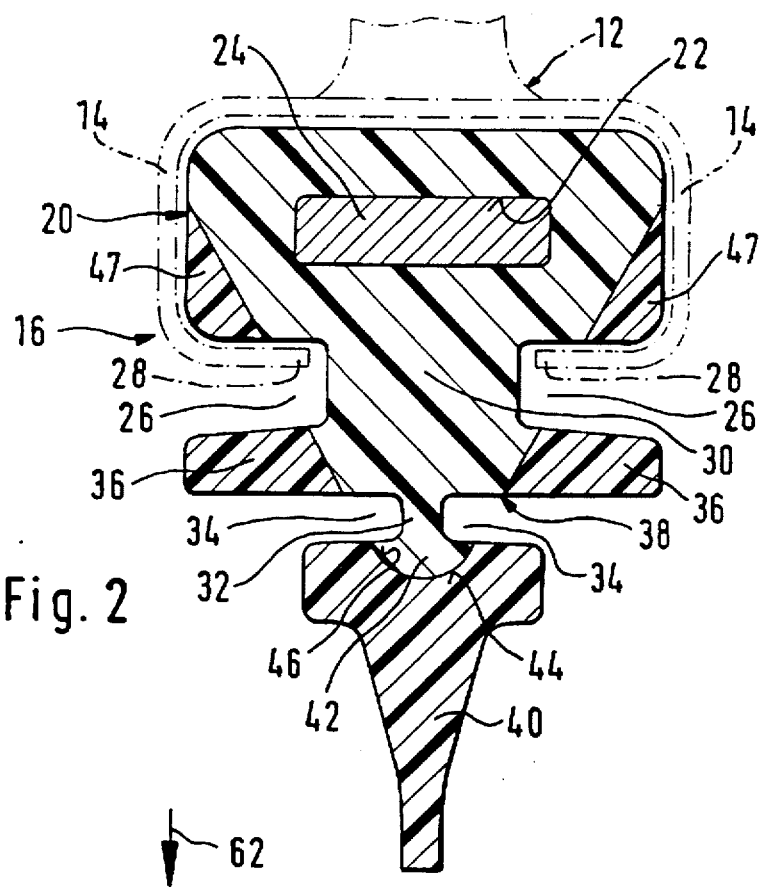

In FIG. 2 the structure of the wiper strip 16 is shown in cross-section. Since the wiper strip 16 has a constant diameter over its entire length, it can be produced by extrusion, for example. It has a tip 20, which is held by the holding claws 14 of the support frame 16. In its longitudinal direction, the tip 20 is penetrated by a longitudinal conduit 22, in which a runner-like spring element 24 is housed, which at least approximately extends over the entire length of the wiper strip 16 and provides the proper distribution of the wiper blade bearing force. On the side facing away from the support frame, the tip 20 has two longitudinal grooves 26 located opposite each other, into which the holding claws 14 dip with their end sections 28. Between the two longitudinal grooves 26 a base component 30 of the wiper strip 16 making a transition into the tip remains. On the side of the base component 30 facing away from the tip 20 a narrow tilting bar 32 is joined, which is formed by narrow longitudinal slots 34, which are spaced apart from the longitudinal grooves 26. The tilting bar 32 remains between the base surfaces of the opposing and oppositely arranged longitudinal slots 34. Between the longitudinal grooves 26 and the longitudinal slots 34 wing-like widenings 36 remain, which form a skirting strip 38 extending over the entire width of the wiper strip 16. On its end facing away from the skirting strip 38, the tilting bar 32 makes a transition into a wiper lip strip 40, which during operation of the wiping device rests at least at its free end on the windshield to be wiped and takes over the cleaning.

As shown by FIG. 2, the greater portion of the wiper lip strip 40 is made of a different materials then the tip 20, the base component 30 and the tilting bar 32. The wiper lip strip 40 is connected to the tilting bar 32 by a connector strip 42 connected in one piece with the latter. This connector strip 42 also extends over the entire length of the wiper strip 16. It has a curved end contour 44 facing the wiper lip strip 40, on which an opposite contour 46 is matched to the wiper lip strip 40, which is almost wedge-shaped the cross-section. This results in a relatively large connecting surface between the tilting bar 32 and the wiper lip strip 40. Further, FIG. 2 shows that the two widenings or wings 36 of the wiper strip 16 are made from a different material than the tip 20 and the base component 30. Those two areas 20, 30 of the wiper strip 16 as well as the tilting bar 32 and the connector strip 42 consist of synthetic caoutchouc. The wings 36 of the wiper strip 16 however, or at least their areas which form the outer contour of the skirting strip, are made of natural caoutchouc with a low coefficient of friction. This also applies to the wiper lip strip 40, which is made of the same material as the wings 36 of the skirting strip 38. In certain cases it can be advantageous, too, if the corner areas 47, which form the outer contour of the tip 20 and which are facing the windshield 60 (FIG. 3), are also made of natural caoutchouc with a low coefficient of friction. Because of this the wiper strip can more easily move in the holding claws of the support frame, which is particularly necessary when passing over variously curved windshield areas. In addition, the danger of a disadvantageous deformation of the corner areas 47 is ruled out. The areas 40, 36, 47 of the wiper strip 16 consisting of the said natural caoutchouc can be extruded in one production step and vulcanized in one single piece, along with the areas 20, 30, 32, 42 of the wiper strip 16 which consist of synthetic caoutchouc.

Figure 3:
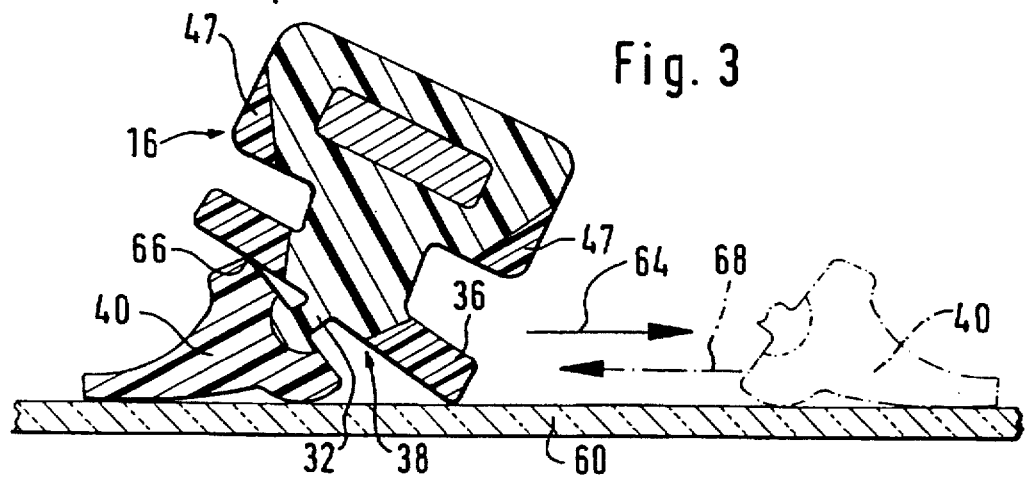

In what follows, the mode of functioning of the wiper blade 10 on the windshield 60 will be explained by means of in FIG. 3, in which the wiper strip 40 is shown in an extremely slanted position in respect to the windshield 60. Such extreme positions can result under certain conditions, known to the expert-for example a severe curvature of the windshield, high bearing pressure on the windshield by the wiper blade, deformed wiper arms etc. In order to obtain a cleansing effect, the wiper strip 16 has to be loaded toward the windshield. This is suggested by the arrow 62 shown in FIG. 3. Thus, if the wiper blade is moved over the surface of the windshield 60 in the direction suggested by the arrow 64, the wiper lip strip 40 tilts into a so-called drag position, in which it is dragged over the windshield 60. In this case, under the disadvantageous operating condition already described, the one wing 36 of the skirting strip 38 which is facing the windshield 60, can touch the surface of the windshield 60 to be wiped with its end area. With the known, already mentioned wiper blades with wings made of synthetic caoutchouc—whose coefficient of friction is too high—undesirable, braking and vibration causing side effects develop, which in addition adversely influence the wiping quality. In addition, FIG. 3 shows that the wiper lip strip 40 is supported with a corner edge 66 on the skirting strip 38, so that the bearing force (arrow 62) is properly put into effect. When the wiper blade 10 gets into its reverse position and it reverses its direction of movement, it is moved in the opposite direction (arrow 68) over the windshield 60. In the process, the wiper lip strip 40 tilts over into its other operating position in the tilting bar 32, indicated by the dashdotted line in FIG. 3, so that the wiper lip strip 40 also is dragged over the windshield and not pushed. To assure a safe tilt of the wiper lip strip 40 in its respective drag position, a certain amount of friction between the windshield and the wiper lip strip 40 is required. The coefficient of friction of the natural caoutchouc material must take this requirement into account. However, this coefficient of friction necessary for the tilt into the respective drag position should not be substantially exceeded, so that the fundamental object of the invention can be attained.

It is therefore provided by the concept of the invention that at least a portion of the areas constituting the outer contour of the skirting strip 38, or the areas constituting the outer contour of the wiper lip strip 40, consist of natural caoutchouc with a low coefficient of friction. This preferably refers to the areas which could bear on the windshield 60 during the wiping operation (FIG. 3).

The desired coefficient of friction p to be attained, measured at a temperature of 23±5° C. and at a humidity of 50±3% should be approximately 2.0, or preferably lower than 2.0.

I claim:

1. A wiper blade for windshields of motor vehicles, comprising a support frame; an elongated wiper strip held by said support frame, said elongated wiper strip being loaded toward a windshield to be wiped and being movable over the windshield transversely to a longitudinal extension of the windshield, said wiper strip having a longitudinal extension provided with a tip which is held by said support frame, a skirting strip connected with said tip and having a side facing away from said tip, and a movable wiper strip attached to said side of said skirting strip by an elongated tilting bar, at least a portion of areas forming an outer contour of said skirting strip being composed of natural caoutchouc with a low coefficient of friction, said wiper strip also having a base component composed of synthetic caoutchouc and having a part which forms a core area of said skirting strip and said tilting bar, said wiper strip further having two wings extending away from said core area in different directions and composed of natural caoutchouc with a low coefficient of friction to form a part of said skirting strip, said wiper strip further having a connector strip arranged so that said tilting bar makes a transition to said connecting strip, said wiper strip also having a wiper lip arranged on said connector strip and composed of natural caoutchouc with a low coefficient of friction.

2. A wiper blade as defined in claim 1, wherein at least a portion of areas forming an outer contour of said wiper lip strip is composed of a natural caoutchouc with a low coefficient of friction.

3. A wiper blade as defined in claim 1, wherein areas forming an outer contour of said tip are composed of natural caoutchouc with a low coefficient of friction.

4. A wiper blade as defined in claim 1, wherein areas of said wiper strip which are composed of natural caoutchouc are halogenized.

5. A wiper blade as defined in claim 1, wherein the coefficient of friction measured at a temperature at approximately 23° and a humidity of approximately 50% is approximately 2.0.

6. A wiper blade as defined in claim 5, wherein the coefficient of friction is less than 2.0.

* * * * *